United States Patent
Kim et al.

(10) Patent No.: US 8,979,177 B2
(45) Date of Patent: Mar. 17, 2015

(54) SIDE LOWER VEHICLE BODY STRUCTURE OF VEHICLE

(71) Applicant: Hyundai Motor Company, Seoul (KR)

(72) Inventors: Hyeyeon Kim, Anyang-si (KR); Tae Wan Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/096,967

(22) Filed: Dec. 4, 2013

(65) Prior Publication Data

US 2014/0159427 A1 Jun. 12, 2014

(30) Foreign Application Priority Data

Dec. 11, 2012 (KR) ........................ 10-2012-0143871

(51) Int. Cl.
*B62D 25/04* (2006.01)
*B62D 25/02* (2006.01)

(52) U.S. Cl.
CPC .............. *B62D 25/04* (2013.01); *B62D 25/025* (2013.01)
USPC .................. 296/193.06; 296/187.12; 296/209

(58) Field of Classification Search
USPC .................. 296/193.06, 187.12, 209, 187.01, 296/190.03, 193.01, 193.05, 203.01, 205, 296/203.03, 29, 30
See application file for complete search history.

(56) References Cited

U.S. PATENT DOCUMENTS

| | | | | | |
|---|---|---|---|---|---|
| 2,007,255 | A | * | 7/1935 | Rohr | 296/193.06 |
| 5,094,504 | A | * | 3/1992 | Wurl | 296/203.03 |
| 5,820,204 | A | * | 10/1998 | Masuda et al. | 296/187.12 |
| 6,267,438 | B1 | * | 7/2001 | Jonsson | 296/203.03 |
| 6,761,394 | B2 | * | 7/2004 | Gennai et al. | 296/203.01 |
| 7,445,269 | B2 | * | 11/2008 | Yustick et al. | 296/187.01 |
| 7,914,068 | B2 | * | 3/2011 | Mizohata | 296/193.06 |
| 8,141,938 | B2 | * | 3/2012 | Miyashita | 296/193.06 |
| 8,439,429 | B2 | * | 5/2013 | Shida et al. | 296/193.06 |
| 8,496,288 | B2 | * | 7/2013 | Juettner et al. | 296/193.05 |

FOREIGN PATENT DOCUMENTS

| | | |
|---|---|---|
| JP | 06-206579 A | 7/1994 |
| JP | 08-072742 A | 3/1996 |
| JP | 10-244970 A | 9/1998 |
| JP | 2010-173403 A | 8/2010 |
| KR | 10-2012-0033879 A | 4/2012 |

* cited by examiner

*Primary Examiner* — Pinel Romain
(74) *Attorney, Agent, or Firm* — McDermott Will & Emery LLP

(57) ABSTRACT

A side lower vehicle body structure of a vehicle includes a side seal, a center pillar and a reinforcing member. The side seal extends in a longitudinal direction of the vehicle and has a channel. The center pillar has one end disposed in the channel of the side seal and the other end extending in a height direction of a vehicle. The reinforcing member is disposed in the channel of the side seal and combined with the center pillar.

7 Claims, 3 Drawing Sheets

SIDE LOWER VEHICLE BODY STRUCTURE OF VEHICLE

CROSS-REFERENCE TO RELATED APPLICATION

This application claims benefit of priority to Korean Patent Application No. 10-2012-0143871 filed in the Korean Intellectual Property Office on Dec. 11, 2012, the entire contents of which are incorporated herein by reference.

TECHNICAL FIELD

The present inventive concept relates to a side lower vehicle body structure of a vehicle. More particularly, the present inventive concept relates to a side lower vehicle body structure of a vehicle, which enhances connection rigidity between a center pillar and a side sill.

BACKGROUND

In general, a side vehicle body includes a side sill extending at a lower portion in a longitudinal direction of a vehicle and pillars with one end connected to the side sill and the other end extending in a height direction of the vehicle to the roof of the vehicle.

The pillars include a front pillar or an A-pillar disposed at the front in the longitudinal direction of the vehicle, a center pillar or a B-pillar disposed at the center of the vehicle, and a rear pillar or a C-pillar disposed at the rear of the vehicle.

The center pillar disposed at the center in the longitudinal direction of the vehicle serves an important role of suppressing the side vehicle body being pushed inside the vehicle in a broadside collision of the vehicle.

Therefore, it is necessary to increase the rigidity of the center pillar and the side sill and also necessary to increase connection rigidity at the joint of the center pillar and the side sill, in order to improve rigidity against a broadside collision of the vehicle.

In particular, for convertible vehicles, since there is no roof, it is necessary to more increase the connection rigidity of the center pillar, the side sill, and the joint thereof, so it is possible to keep passengers more safe in a broadside collision of the vehicles.

In general, since the center pillar is welded to the side sill, it is necessary to increase torsional rigidity of a lower portion of the vehicle body of convertible vehicles, so the performance against a broadside collision of the vehicles is improved.

Further, the torsional rigidity of the lower portion of the vehicle body almost depends on the bending rigidity of the side sill, and it is necessary to increase rigidity at the joints where the side sill is connected with the front pillar and the center pillar in order to increase the bending rigidity of the side sill.

The above information disclosed in this Background section is only for enhancement of understanding of the background of the inventive concept and therefore it may contain information that does not form the prior art.

SUMMARY

The present inventive concept has been made in an effort to provide a side lower vehicle body structure of a vehicle having advantages of being able to keep passengers more safe through an effective action over a broadside collision of a vehicle by increasing connection rigidity at the joint of a side sill and a center pillar.

An aspect of the present inventive concept relates to a side lower vehicle body structure of a vehicle including: a side sill extending in a longitudinal direction of the vehicle and having a channel, a center pillar with one end disposed in the channel of the side sill and the other end extending in a height direction of the vehicle, and a reinforcing member disposed in the channel and combined with the center pillar.

The channel of the side sill may be open at one side and continuously has a "⊏"-shaped cross-section in the longitudinal direction of the vehicle.

The channel of the side sill may have a central vertical surface extending in the height direction of the vehicle, an upper horizontal surface integrally extending along an upper edge of the central vertical surface and bending horizontally at a right angle from the upper edge of the central vertical surface, and a lower horizontal surface integrally extending along a lower edge of the central vertical surface and bending horizontally at a right angle from the lower edge of the central vertical surface.

The side sill may have an assembly groove that communicates with the channel of the side sill to receive and combine with the center pillar.

A fastening flange may protrude from both edges of the assembly groove in the height direction of the vehicle.

The center pillar may have a center pillar body forming a "⊓"-shaped channel by keeping a "⊓"-shaped cross-sectional extending in the height direction of a vehicle, a fastening box flange disposed in the channel of the side sill and combined with the channel of the side sill, and a connecting portion integrally connecting the fastening box flange with the center pillar body and combined with a fastening flange of the side sill.

The fastening box flange may have a central vertical surface being in close contact with the central vertical surface of the side sill, a lower horizontal surface integrally extending along a lower edge of the central vertical surface and bending horizontally from the lower edge of the central vertical surface, and a left surface and a right surface integrally extending along left and right edges of the central vertical surface of the fastening box flange, respectively, bending at a right angle from the left and right edges of the central vertical surface of the fastening box flange, respectively, and closing an inside of the channel of the side sill.

The reinforcing member may have a channel shape with a "⊏"-shaped cross-section extending in the height direction of the vehicle.

The channel of the reinforcing member may have a central vertical surface extending in the height direction of the vehicle, a left surface and a right surface extending along left and right edges of the central vertical surface of the channel of the reinforcing member, respectively, bending at a right angle from the left and right edges of the central vertical surface of the channel of the reinforcing member, respectively, and closing an inside of the channel of the side sill, and a horizontal surface attached to a lower horizontal surface of the center pillar.

According to the side lower vehicle body structure of a vehicle of an exemplary embodiment of the present inventive concept, the lower portion of the center pillar is inserted and integrally formed in the channel formed by the side sill and the reinforcing member is inserted and integrally combined in the channel formed by the center pillar. Thus, combination rigidity of the side sill and the center pillar is increased, thereby intensively coping with a broadside collision of the vehicle.

Further, since a plurality of walls are formed in the channel of the side sill by the center pillar and the reinforcing member, torsional rigidity and bending rigidity of the side lower vehicle body are increased, such that it is possible to strongly support the vehicle body. In addition, when the structure is applied to a convertible vehicle, rigidity against a broadside collision is effectively increased, thereby keeping passengers more safe.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION

Figure 1:
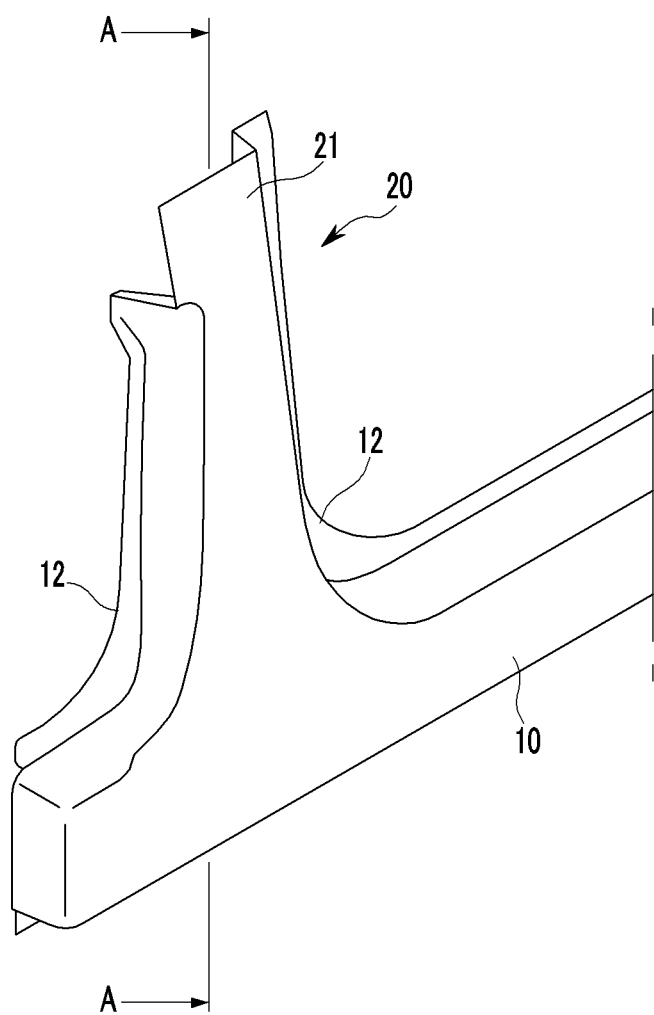
FIG. 1 is a perspective view showing an outer side of a side lower vehicle body structure of a vehicle according to an exemplary embodiment of the present inventive concept.

In the following detailed description, only certain exemplary embodiments of the present inventive concept have been shown and described, simply by way of illustration. As those skilled in the art would realize, the described embodiments may be modified in various different ways, all without departing from the spirit or scope of the present inventive concept. Accordingly, the drawings and description are to be regarded as illustrative in nature and not restrictive. Like reference numerals designate like elements throughout the specification.

Exemplary embodiments of the present inventive concept will be described hereafter in detail with reference to the accompanying drawings.

Figure 2:
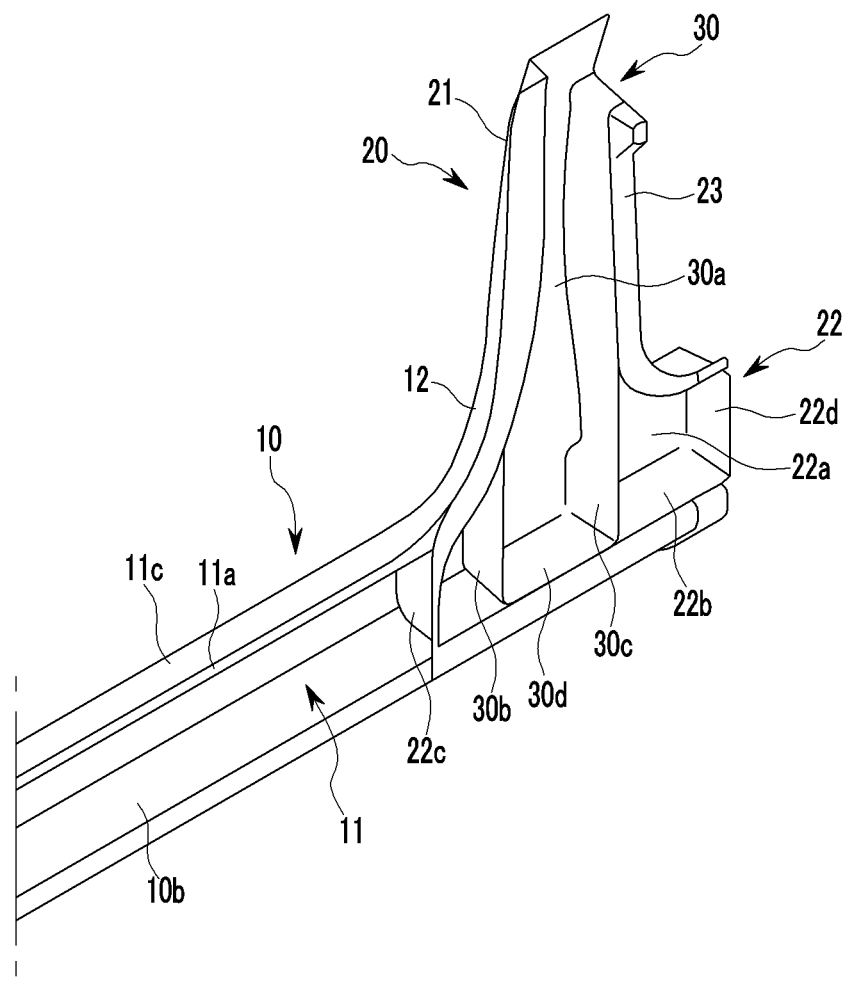
FIG. 2 is a perspective view showing an inner side of a side lower vehicle body structure of a vehicle according to an exemplary embodiment of the present inventive concept.
Figure 3:
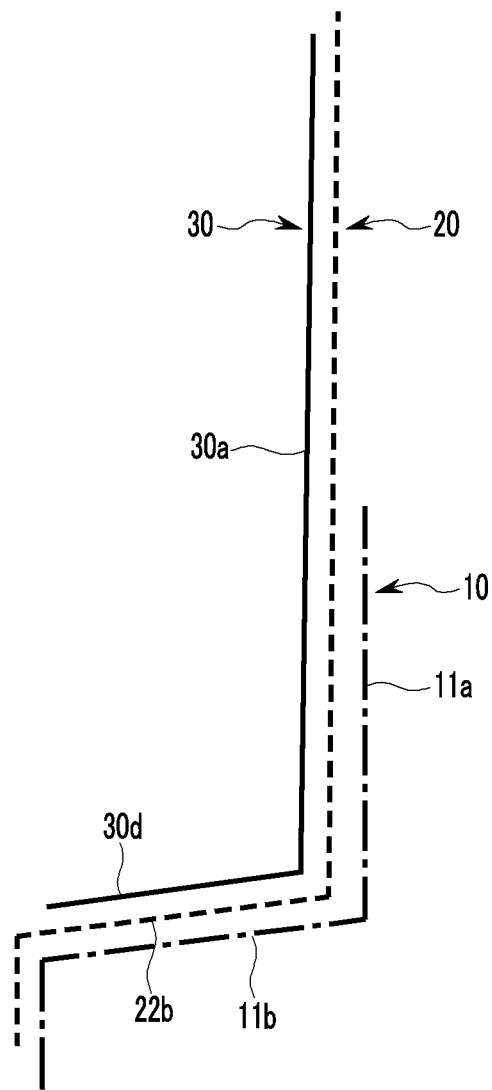
FIG. 3 is a cross-sectional view taken along the line A-A in FIG. 1.

Referring to FIGS. 1 to 3, a side lower vehicle body structure of a vehicle according to an exemplary embodiment of the present inventive concept may include a side sill 10, a center pillar 20 with one end connected to the side sill 10 and the other end extending in a height direction of the vehicle, and a reinforcing member 30 (see FIG. 2) inserted in the center pillar 20.

The side sill 10 may have a cross-section substantially shaped like "⊏" with one side open.

The cross-section shaped like "⊑" of the side sill 10 may be continuously formed in a longitudinal direction of the vehicle, such that a channel 11 extending in the longitudinal direction of the vehicle is formed therein.

The channel 11 may have a central vertical surface 11a extending in the height direction of the vehicle, an upper horizontal surface 11b (see FIG. 3) integrally extending along the upper edge of the central vertical surface 11a and bending horizontally at a right angle, and a lower horizontal surface 11c integrally extending along a lower edge of the central vertical surface 11a and bending horizontally at a right angle from the lower edge of the central vertical surface 11a.

An assembly groove that communicates with the "⊑"-shaped cross-section may be formed at a joint where the side sill 10 is longitudinally connected with the center pillar 20.

A fastening flange 12 may protrude from both edges of the assembly groove in the height direction of the vehicle.

The center pillar 20 may be inserted in the "⊐"-shaped channel 11 through the assembly groove and combined with the side sill 10.

The center pillar 20 may have a center pillar body 21 forming a "⊑"-shaped channel by keeping the "⊑"-shaped cross-section of the channel 11 extending in the height direction of a vehicle.

A lower portion of the center pillar 20 may be inserted in the channel 11 through the assembly groove of the side sill 10.

The lower portion of the center pillar 20 may have a fastening box flange 22 expanding in a longitudinal direction of the channel 11, that is, in the longitudinal direction of the vehicle.

The fastening box flange 22 may have a substantially rectangular box shape that is open inward in a width direction of the vehicle, that is, open to the interior of the vehicle.

The fastening box flange 22 may have a central vertical surface 22a that is in close contact with the central vertical surface 11a of the side sill 10, a lower horizontal surface 22b integrally extending along a lower edge of the central vertical surface 22a and bending horizontally from the lower edge of the central vertical surface 22a, and a left surface 22c and a right surface 22d which integrally extend along left and right edges of the central vertical surface 22a, respectively, and bend at a right angle from the left and right edges of the central vertical surface 22a, respectively.

The fastening box flange 22 may be integrally connected with the center pillar body 21 by a connecting portion 23.

The connecting portion 23 may have the same shape as the shape of the fastening flange 12 of the side sill 10.

When the center pillar 20 is combined with the side sill 10, the connecting portion 23 of the center pillar may be inserted in close contact in the fastening flange 12 of the side sill 10 and the fastening box flange 22 of the center pillar 20 may be inserted in the channel 11 of the side sill 10 in close contact with an inner side of the channel 11.

That is, the central vertical surface 22a of the fastening box flange 22 may be in close contact with the central vertical surface 11a of the side sill 10, the lower horizontal surface 22b of the fastening box flange 22 may be in close contact with the lower horizontal surface 11b of the side sill 10, and the left surface 22c and the right surface 22d may be disposed in the channel 11 and close to the channel 11.

The reinforcing member 30 may be inserted in the center pillar 20.

The reinforcing member 30 may have a channel shape with a "⊏"-shaped cross-section extending in the height direction of the vehicle.

The channel of the reinforcing member 30 may have a central vertical surface 30a extending in the height direction of the vehicle, a left surface 30b extending along one edge, that is, a left edge of the central vertical surface 30a in the figure (see FIG. 2) and bending at a right angle from the left edge of the central vertical surface 30a, and a right surface 30c extending along the other edge, that is, a right edge of the central vertical surface 30a in the figures (see FIG. 2) and bending at a right angle from the right edge of the central vertical surface 30a.

A horizontal surface 30d closing one opening of the channel of the reinforcing member 30 may be formed at a lower end of the channel of the reinforcing member 30.

When the reinforcing member 30 is combined with the center pillar 20 by being inserted in the channel of the center pillar 20, the horizontal surface 30d of the reinforcing member may be in close contact with the lower horizontal surface 22b of the center pillar 20, and the central vertical surface 30a, the left surface 30b, and the right surface 30c of the reinforcing member 30, may be inserted in the channel of the center pillar body 21 and integrally combined with the channel of the center pillar body 21.

As described above, when the center pillar 20 and the reinforcing member 30 are combined with the side sill 10, four walls may be formed by the left surface 22c and the right surface 22d of the center pillar 20 and the left surface 30b and the right surface 30c of the reinforcing member 30, such that the structural rigidity is effectively improved, and the torsional rigidity and bending rigidity of the side lower vehicle body are increased.

Further, as shown in FIG. 3, since the center pillar 20 and the reinforcing member 30 may be sequentially attached to the side sill 10, combination rigidity may be increased.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

| <Description of symbols> | |
|---|---|
| 10: Side sill | 11: Channel |
| 11a: Central vertical surface | 11b: Upper horizontal surface |
| 11c: Lower horizontal surface | 12: Fastening flange |
| 20: Center pillar | 21: Center pillar body |
| 22: Fastening box flange | 30: Reinforcing member |

What is claimed is:

1. A side lower vehicle body structure of a vehicle, comprising:
    a side sill extending in a longitudinal direction of the vehicle and having a channel;
    a center pillar with one end disposed in the channel of the side sill and the other end extending in a height direction of the vehicle; and
    a reinforcing member disposed in the channel of the side sill and combined with the center pillar, wherein:
    the reinforcing member has a channel shape with a "⊏"-shaped cross-section extending in the height direction of the vehicle, and
    the channel of the reinforcing member has:
        a central vertical surface extending in the height direction of the vehicle;
        a left surface and a right surface extending along left and right edges of the central vertical surface of the channel of the reinforcing member, respectively, bending at a right angle from the left and right edges of the central vertical surface of the channel of the reinforcing member, respectively, and closing an inside of the channel of the side sill; and
        a horizontal surface attached to a lower horizontal surface of the center pillar.

2. The side lower vehicle body structure of claim 1, wherein the channel of the side sill is open at one side and continuously has a "⊏"-shaped cross-section in the longitudinal direction of the vehicle.

3. The side lower vehicle body structure of claim 2, wherein
    the channel of the side sill has:
    a central vertical surface extending in the height direction of the vehicle;
    an upper horizontal surface integrally extending along an upper edge of the central vertical surface and bending horizontally at a right angle from the upper edge of the central vertical surface; and
    a lower horizontal surface integrally extending along a lower edge of the central vertical surface and bending horizontally at a right angle from the lower edge of the central vertical surface.

4. The side lower vehicle body structure of claim 3, wherein the side sill has an assembly groove that communicates with the channel of the side sill to receive and combine with the center pillar.

5. The side lower vehicle body structure of claim 4, wherein a fastening flange protrudes from both edges of the assembly groove in the height direction of the vehicle.

6. The side lower vehicle body structure of claim 4, wherein
    the center pillar has:
    a center pillar body forming a "⊏"-shaped channel by keeping a "⊏"-shaped cross-sectional extending in the height direction of a vehicle;
    a fastening box flange disposed in the channel of the side sill and combined with the channel of the side sill; and
    a connecting portion integrally connecting the fastening box flange with the center pillar body and combined with a fastening flange of the side sill.

7. The side lower vehicle body structure of claim 6, wherein
    the fastening box flange has:
    a central vertical surface, being in close contact with the central vertical surface of the side sill;
    a lower horizontal surface integrally extending along a lower edge of the central vertical surface of the fastening box flange and bending horizontally from the lower edge of the central vertical surface of the fastening box flange; and
    a left surface and a right surface integrally extending along left and right edges of the central vertical surface of the fastening box flange, respectively, bending at a right angle from the left and right edges of the central vertical surface of the fastening box flange, respectively, and closing an inside of the channel of the side sill.

* * * * *